Nov. 10, 1936.    H. H. BUBAR    2,060,169
DUST SEPARATOR AND HEAT EXCHANGE APPARATUS
Filed Sept. 26, 1930    2 Sheets-Sheet 1

INVENTOR.
Hudson H. Bubar
BY Nathaniel Frucht
his ATTORNEY

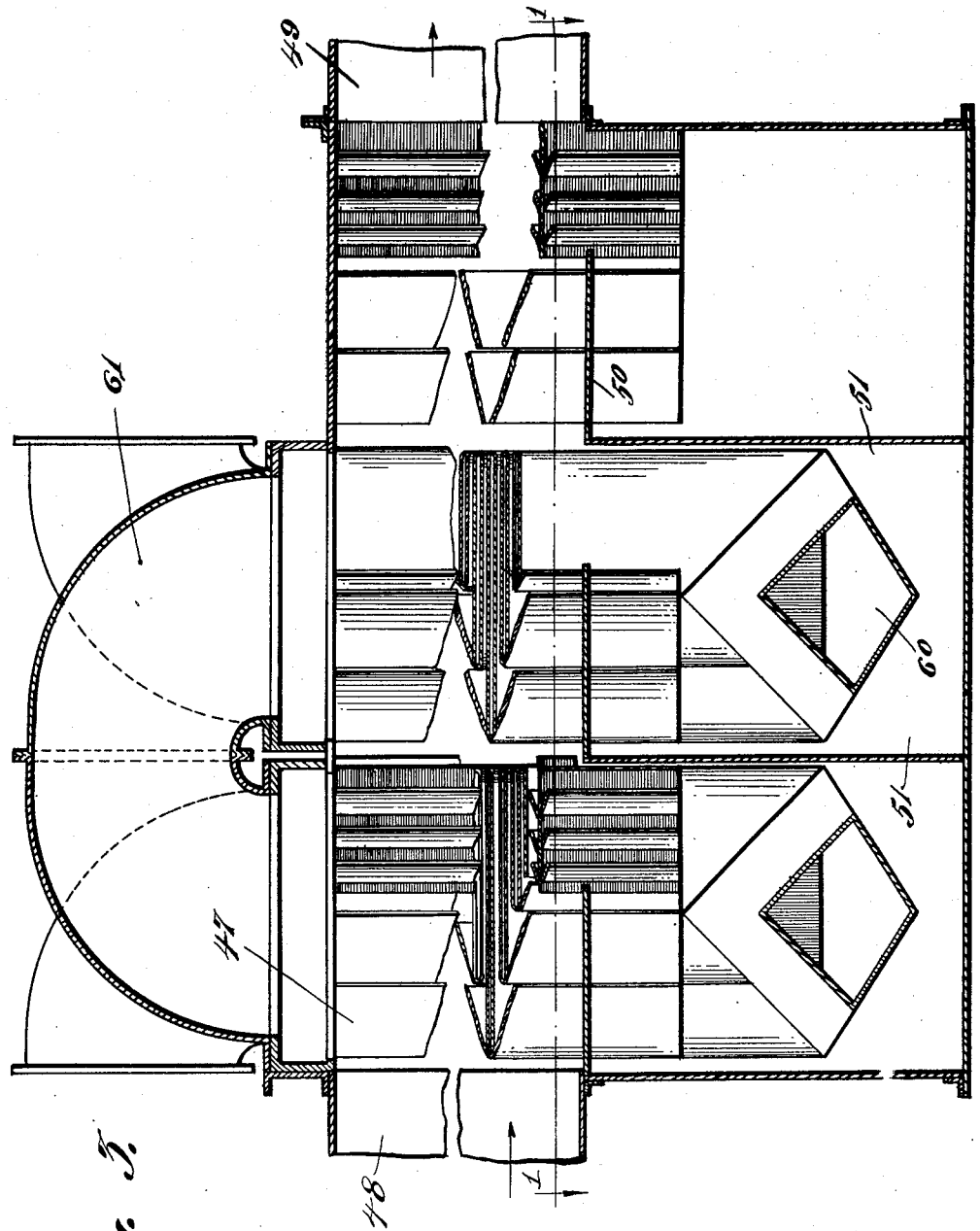

Patented Nov. 10, 1936

2,060,169

UNITED STATES PATENT OFFICE 2,060,169

DUST SEPARATOR AND HEAT EXCHANGE APPARATUS

Hudson Harris Bubar, Brooklyn, N. Y.

Application September 26, 1930, Serial No. 484,609

5 Claims. (Cl. 183—32)

The present invention pertains to power plants and industrial plants where gases which carry dust, such as gases of combustion, are generated, and includes an apparatus for carrying out the functions of removing the dust and reclaiming a considerable portion of the available heat embodied in the gases for further use in the industry, thereby increasing the overall thermal efficiency of the plant.

Heretofore these functions have been separate, and have required separate apparatus in the nature of dust separators and of heaters such as economizers and preheaters.

My present invention therefore relates to a combined dust separator and heater, which latter may be an economizer or a preheater, for example, although I do not limit myself to any specific type of heater, as individual installations may include one or more types.

The use of a heater construction as an integral part of a dust separator is advantageous in obtaining high separation of the dust by lowering of the temperature of the flue gases and thereby decreasing the velocity of these gases as they pass through or between the dust collecting elements. The principal object of the present invention is to so combine a dust separator and heater as to take full advantage of these conditions and regulate them by controlling the reduction in temperature of the dust-laden gases.

Hereinafter the term "heaters" will be used to include both economizers or preheaters, as in both cases the purpose is essentially to transfer heat from the gases to the medium to be heated. Also hereinafter the medium to be heated, which may be liquid or gas, will be referred to as "fluid".

Since heated fluids are desirable both for power and industrial uses, a second object of my invention is to transfer the heat extracted from the dust-laden gases to the said fluids, thereby increasing the operating efficiency of the power or industrial plant.

A difficulty heretofore found in the practical utilization of dust separators for gases having very high temperatures, has resided in the warping and burning of the separator elements exposed to the hottest gases. Another object of this invention is to lower the temperature of the gases and thus lengthen the operating life of the apparatus.

This lowering of gas temperature, however, should not be carried to a point where the cooled gases may have a corrosive effect on the exit portion of the dust separator. A further object is therefore to control the temperature of the hot gases so as to maintain this temperature safely above the corrosion limit.

Further objects and advantageous features will be readily apparent from the detailed description following, in conjunction with the accompanying drawings, and will be particularly pointed out in the appended claims.

In the drawings:

Fig. 3 is a vertical section, with parts broken away in perspective, on the line 3—3 of Figure 1.

The essential features of a separator-heater suitable for separation of fine dust such as fly ash from power plant flue gases are efficiency in heat transfer and dust removal, simplicity in manufacture, installation, and repair, and low initial and maintenance cost.

Figure 1:
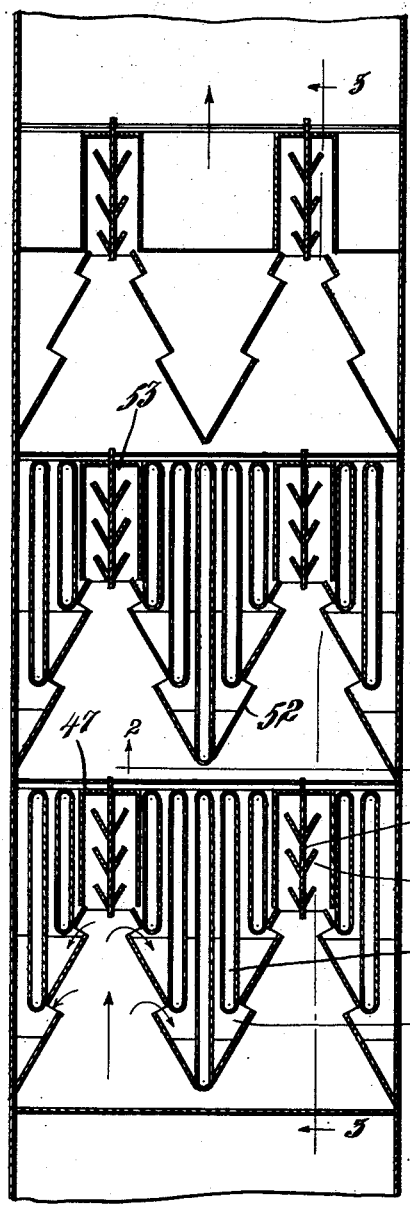
Fig. 1 is a horizontal section of a form of separator-heater taken on the line 1—1 of Fig. 3.
Figure 2:
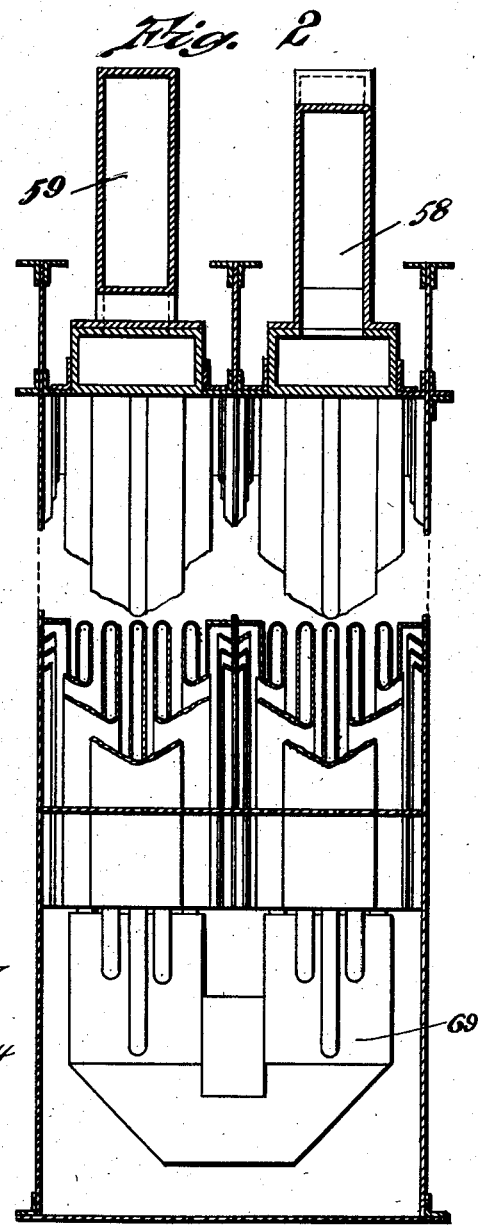
Fig. 2 is a vertical section, with parts broken away in perspective, on the line 2—2 of Figure 1, the traps and deflectors being changed.

If a high degree of dust removal is necessary, or the available space for a separator-heater is limited, an apparatus of the type shown in Figures 1, 2 and 3 is preferred. This type is the "free vortex" type described in applicant's copending application Serial No. 420,519 now Patent No. 2,013,644, issued Sept. 10, 1935 for separating carefully by centripetal action, and includes a gas flow chamber 47 having a gas inlet 48 and a gas outlet 49, separated by a partition or floor 50 from a plurality of adjacent dust collecting chambers 51.

A plurality of spaced converging baffles 52 direct the flow of hot gases towards spaced traps 53, which extend through the partition 50 into the dust receiving chambers 51, which are preferably completely separated, and are equipped with dust separating baffles which may, if desired, be foraminated. Suitable dust collecting apparatus, not shown, is utilized to remove the separated dust.

Openings 54 are provided for conveying the cleaned gases from the chambers 51 upwardly between the diverging sides of the baffles 52, and central partitions 55 and rearwardly extending whirl imparting baffles 56 are provided in each trap to impart a whirling motion to the descending gases and to produce a centripetal dust concentration therein.

Tubular heat exchange elements 57 are positioned in the path of the gases which have passed between the spaced deflectors and which have reentered the main flow stream through openings 54. These elements 57 may be in the form of vertical tubes, communicating at their ends with inlet and outlet manifolds 58, 59, the fluid to be heated entering one manifold, passing through the heat exchange elements to a cross manifold 60 and up through another set of heat exchange elements to the exit manifold 59, which in turn communicates with another inlet manifold through a conduit such as 61. The number of inlet and exit manifolds, cross manifolds, and conduits depends on the load capacity of the installation, and changes in design such as the provision of valve controlled by-passes, the use of unidirectional flow instead of countercurrent flow, and the like may obviously be made to suit the requirements of individual installations.

This type of construction is relatively expensive, but is particularly suited for separator-heaters of high efficiency, and limited space. The use of heat exchange elements lengthens the life of the apparatus by lowering the temperature of the hot gases, increases the effectiveness of the dust separation, and conserves the waste heat of the hot gases. As indicated in Figures 1 and 3, a predetermined number of rear rows of deflectors and traps are preferably not equipped with heat exchange elements, in order to control the temperature of the exit gases and maintain it above the corrosion point.

The described type of apparatus is suitable for the preheating of air, water, or other fluid; the sizes of the heat exchange partitions, tubes, etc., depend on the particular fluid to be heated, and the temperature and volume of the hot gases available. The type illustrated is particularly adapted to installations having fairly constant operating conditions; if the operating conditions vary greatly, however, it is preferable to provide an apparatus suitable for average conditions, equipped with valve controlled by-passes for controlling the temperature range during the extreme variations.

While I have described a specific structural embodiment of my invention designed for different dust separating duties for different power and industrial plant layouts, it is obvious that various changes in construction and in arrangement of the separator parts may be made, within the spirit and the scope of the invention as defined in the appended claims.

I claim:

1. In combination, a gas flow chamber having a gas inlet and a gas outlet, spaced traps in said chamber, dust receiving apparatus with which said spaced traps communicate, deflector means associated with each trap for directing the flowing gases towards said traps, and fluid conveying means associated with said deflectors for passing fluid in heat exchanging relation to flowing gases.

2. In combination, a gas flow chamber having a gas inlet and a gas outlet, spaced traps in said chamber, dust receiving apparatus with which said spaced traps communicate, spaced deflectors for directing the flowing gases towards said traps, part of said gases flowing between said deflectors and part flowing into said traps, means for cleaning the gases flowing into the trap's means for returning the cleaned gases to join the other gases, and means for extracting heat from the flowing gases.

3. In combination, a gas flow chamber having a gas inlet and a gas outlet, spaced traps in said chamber, dust receiving apparatus with which said spaced traps communicate, spaced deflectors for directing the flowing gases towards said traps, part of said gases flowing between said deflectors and part flowing into said traps, means for cleaning the gases flowing into the traps, means for returning the cleaned gases to join the other gases, conduits positioned in the path of the flowing gases, and means for passing fluid to be heated through said conduits in heat exchange relation to said flowing gases.

4. In combination, a gas flow chamber having a gas inlet and a gas outlet, spaced traps in said chamber, dust receiving apparatus with which said spaced traps communicate, spaced deflectors for directing the flowing gases towards said traps, part of said gases flowing between said deflectors, and part flowing into said traps, means for cleaning the gases flowing into the traps, means for returning the cleaned gases to join the other gases, conduits positioned in the path of the flowing gases, and means for passing fluid to be heated through said conduits in countercurrent heat exchange relation to said flowing gases.

5. In combination, a gas flow chamber having a gas inlet and a gas outlet, spaced traps in said chamber, dust receiving apparatus with which said spaced traps communicate, deflectors for directing the flowing gases towards said traps, and fluid conveying means associated with said deflectors in series relation for passing fluid in heat exchanging relation to the flowing gases.

HUDSON HARRIS BUBAR.